United States Patent [19]

Kardiak

[11] Patent Number: 4,899,908

[45] Date of Patent: Feb. 13, 1990

[54] VENDING MACHINE FOR DISPENSING HEATED PEANUTS

[76] Inventor: Dale Kardiak, 17454 Winemast, Fountain Valley, Calif. 92708

[21] Appl. No.: 292,325

[22] Filed: Dec. 30, 1988

[51] Int. Cl.$^4$ ............................................. B67B 7/00
[52] U.S. Cl. ..................................... 222/1; 222/146.5; 222/158; 222/190; 222/252; 222/278; 222/361; 222/368; 222/638; 99/348
[58] Field of Search ............... 222/146.2, 146.5, 361, 222/368, 113, 190, 252, 158, 278, 239, 1, 638; 221/150 A, 150 AC, 236, 264, 266, 203; 99/348, 483, 484, 485, 486; 141/82

[56] References Cited

U.S. PATENT DOCUMENTS

| D. 250,689 | 1/1979 | Lee et al. | |
|---|---|---|---|
| 1,198,014 | 9/1916 | Dunlany | 222/361 |
| 1,876,332 | 9/1932 | Mabey | 222/113 |
| 2,668,639 | 2/1954 | Martin | |
| 2,852,167 | 9/1958 | Lempart | 222/361 X |
| 2,863,589 | 12/1958 | Philippovic | 222/638 X |
| 3,677,173 | 7/1972 | Fogle, Jr. et al. | 99/484 X |
| 4,156,806 | 5/1979 | Teich et al. | |
| 4,562,941 | 1/1986 | Sanfilippo | 222/361 X |
| 4,586,429 | 5/1986 | Hawkins | 222/368 X |
| 4,721,036 | 1/1988 | Brandt et al. | 99/348 |

Primary Examiner—Joseph J. Rolla
Assistant Examiner—Gregory L. Huson
Attorney, Agent, or Firm—Roger C. Turner

[57] ABSTRACT

A vending machine comprises a substantially enclosed housing which has an upper, a lower, and a front portion and an internal heating apparatus. The machine has an upper reservoir within the upper portion of the housing which contains a large quantity of peanuts. An actuator has a coin responsive proximal portion which extends outside of the front of the housing and has a distal portion within the housing, which segregates a desired relatively small quantity of peanuts from the upper reservoir. A lower reservoir is enclosed within the housing which receives the small quantity of segregated peanuts from the actuator. A heating source is positioned above the lower reservoir which heats the segregated peanuts located within the lower reservoir. The lower reservoir is then pivoted which dispenses the heated peanuts from the lower reservoir to an exterior outlet from the front of the housing.

22 Claims, 7 Drawing Sheets

VENDING MACHINE FOR DISPENSING HEATED PEANUTS

BACKGROUND OF THE INVENTION

The invention relates to a coin operated vending machine, particularly for dispensing heated peanuts.

Vending machines are widely known for dispensing many diverse products. One advantage of vending machines is that they do not require the presence of an operator. The purchaser need only insert the required amount of money into the machine to obtain a desired product from the machine. The owner of the machine has only to periodically refill the machines and empty the coin changing mechanism.

Vending machines are commonly used to dispense packaged snack food such as gum, candy and peanuts. These machines usually dispense such snacks at room temperature. One such machine is illustrated in U.S. Pat. No. 2,668,636 to E. E. Martin which features a popcorn dispenser. Certain bulk snack foods and particularly peanuts are preferably enjoyable when heated. The heating of peanuts to an elevated temperature (about 100° to 120° F.) tends to enhance the aroma and taste, and gives the consumer the feeling that the peanuts are freshly roasted.

An early attempt to provide heated peanuts involved the use of several infra red heat lamps to heat a large reservoir of bulk peanuts. The heated peanuts had a very short shelf life and resulted in spoilage and waste and was not effective. The heat lamps also tended to overheat the exposed surfaces of the upper layer of the peanuts which was also unsatisfactory.

It is an object of the present invention to provide a vending machine for effectively dispensing heated peanuts.

It is another object of the invention to provide a vending machine for dispensing heated peanuts which simulates the fresh roasted peanuts provided from the push cart street vendors of the past.

SUMMARY OF THE INVENTION

The present invention overcomes the disadvantages of the prior art and meets the objects providing a housing which simulates a street vendor push cart and an apparatus which segregates a small portion of peanuts from a bulk reservoir with only the small portion heated prior to being dispensed. The vending machine comprises a substantially enclosed housing which has an upper, a lower, and a front portion and an internal heating apparatus. The machine has an upper reservoir within the upper portion of the housing which contains a large quantity of peanuts. An actuator has a coin responsive proximal portion which extends outside of the front of the housing and has a distal portion within the housing, which segregates a desired relatively small quantity of peanuts from the upper reservoir. A lower reservoir is enclosed within the housing which receives the small quantity of segregated peanuts from the actuator. A heating source is positioned above the lower reservoir which heats the segregated peanuts located within the lower reservoir. The lower reservoir is then pivoted which dispenses the heated peanuts from the lower reservoir to an exterior outlet from the front of the housing.

BRIEF DESCRIPTION OF THE DRAWINGS

While the novel features of the invention are set forth with particularity in the appended claims, the invention will be better understood along with other features thereof from the following detailed description taken in conjunction with the drawings, in which:

DETAILED DESCRIPTION OF THE INVENTION

Figure 1:
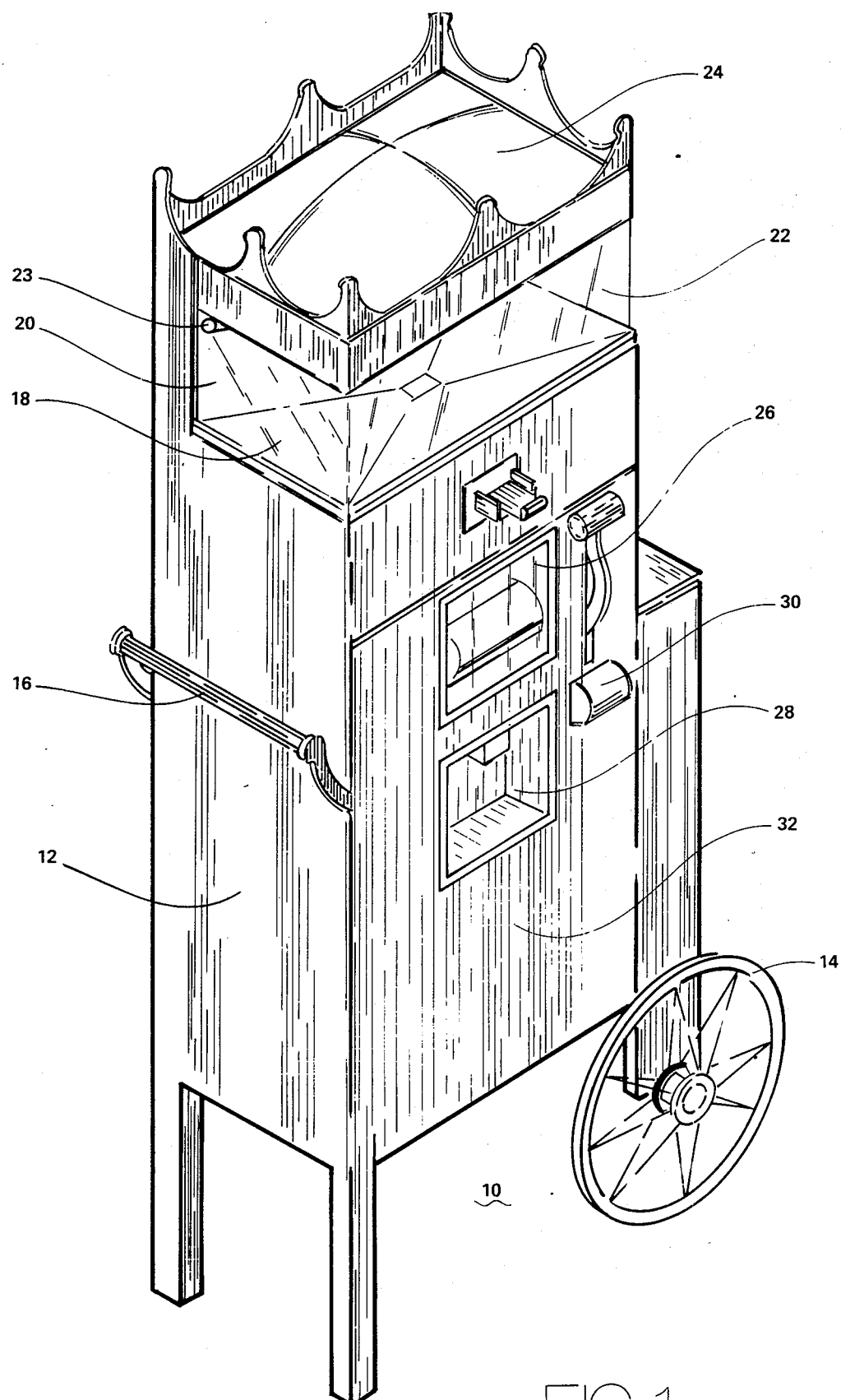
FIG. 1 is a top, front and left perspective view of the housing of the present invention.

Referring to FIG. 1, there is shown a vending machine 10 of the present invention for dispensing heated peanuts. The nuts could be any variety of nuts to include cashews, almonds, etc., but preferably are the type known as cocktail peanuts. The vending machine has a housing 12 designed to simulate a street vendor push cart of the past, having a pair of wheels 14 and a push bar 16; of course the present vending machine is intended to be stationary and requires access to a 110 volt current source to properly function.

The upper portion of the housing provides a reservoir for enclosing a large bulk quantity of peanuts and is defined by a bottom 18, a back wall 20, a wrap-around transparent front wall 22 and a domed top 24. The transparent wall 22 provides a visual display of the peanuts to promote sales and indicates to the owner when it is time to replenish the reservoir, and further indicates to customers when the machine is empty. The domed top 24 is hinged along the back edge and has a keyed latch at the front edge to readily permit access for replenishing peanuts into the reservoir. The upper back wall 20 preferably includes a fluorescent lamp 23 (about 18" tube type) attached thereto to enhance the visual display of the reservoir. The domed top 24 is preferably formed of a translucent material which further enhances the lighting and display of the machine.

The housing includes a front window 26 for displaying the peanuts while they are being heated. The visual effect is further enhanced by a small (7½ watt) red incandescent lamp 27 which is illuminated within the interior above the window.

The housing includes a recessed outlet 28 where the heated peanuts are dispensed. Adjacent to the outlet is a bag retainer 30 which readily provides containers for receiving the dispensed peanuts. The front panel 32 is hinged along one vertical edge and has a keyed latch on the opposite edge to provide access into the interior of the machine housing to collect the money and to service the components. The interior also provide a large lower storage compartment for storing extra peanuts, bags, replacement lamps, etc.

Referring now to FIGS. 2-5, the interior apparatus which segregates and heats the nuts is illustrated.

Figure 2:
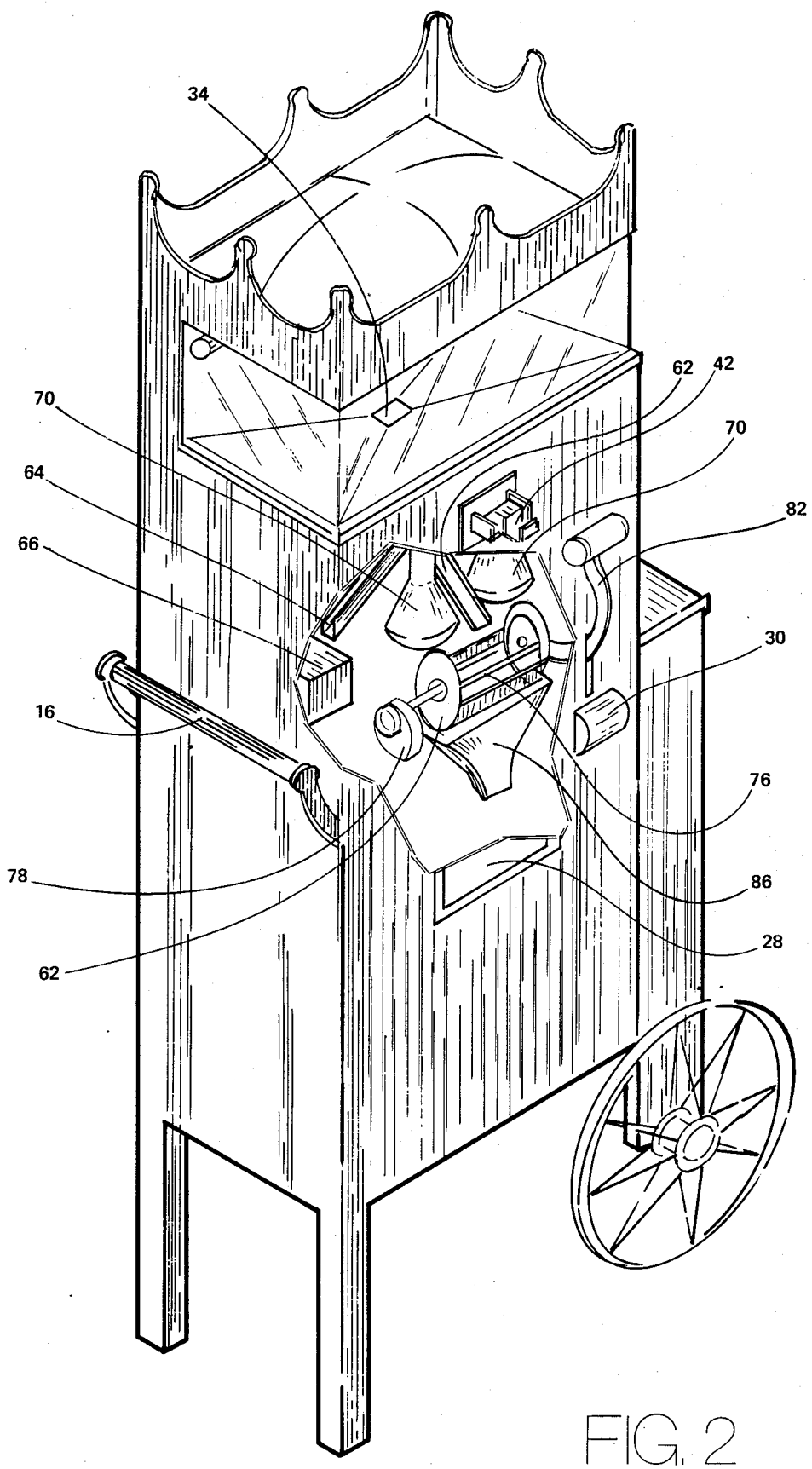
FIG. 2 is a view similar to FIG. 1 having a portion of the housing cut away to expose the interior apparatus.

FIG. 2 is shown with the upper reservoir empty, to illustrate a small planer outlet 34 in the reservoir bottom 18. The surfaces of bottom 18 are slightly inclined sloping downwardly toward the planer outlet 34 to facilitate the emptying of all of the peanuts from the reservoir through the outlet. The outlet 34 has dimensions of about 2 inches by 2 inches which adequately allow peanuts (as well as most varieties of nuts) to smoothly flow from the reservoir by natural gravity when the outlet is not covered.

Figure 3:
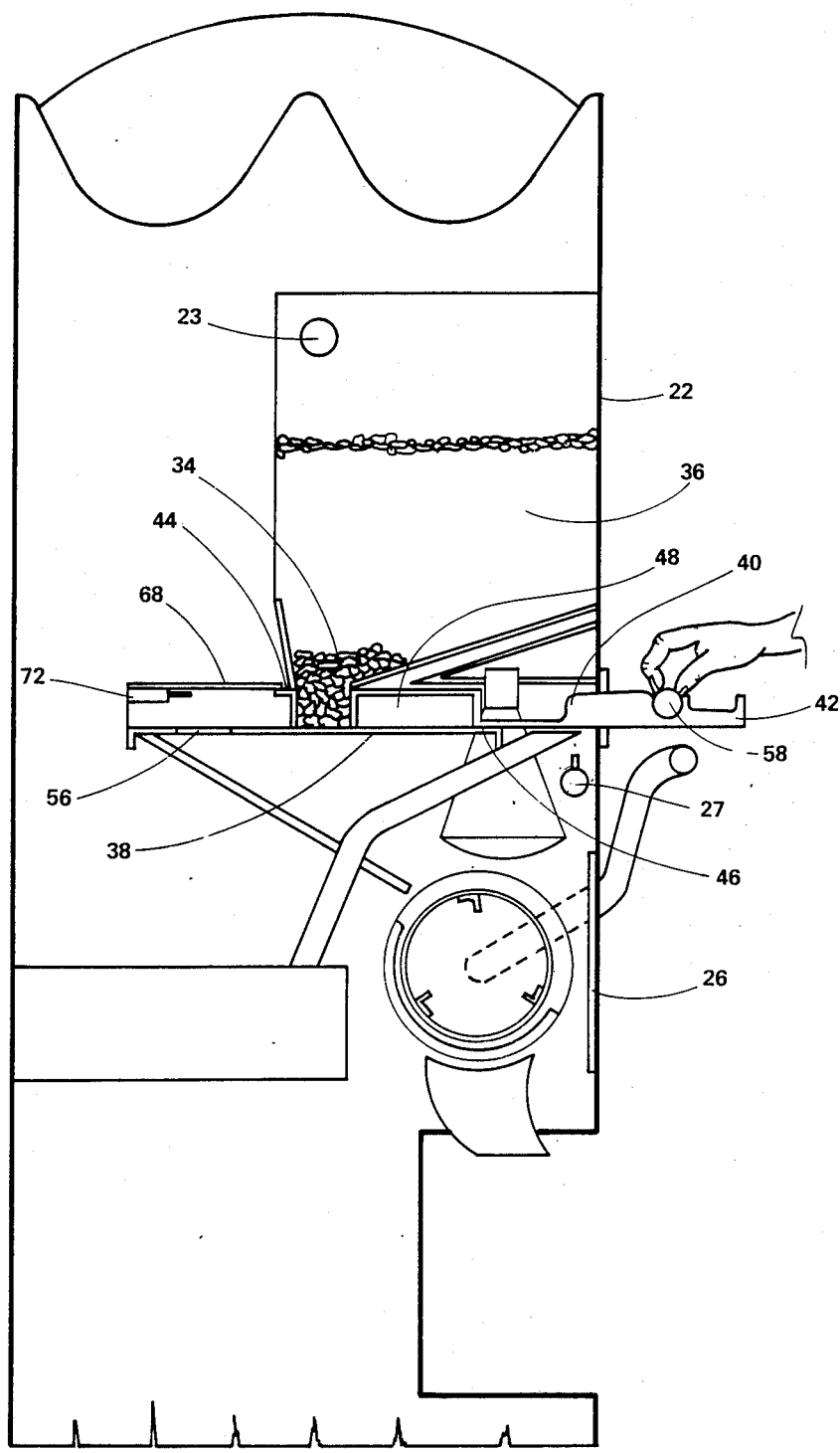
FIG. 3 is a sectional view taken along the longitudinal center of the machine of FIG. 1.

Referring also to FIG. 3, which is illustrated with a quantity of bulk peanuts 36 in the reservoir, there is shown the major components of the apparatus. The apparatus includes a generally planer lateral support member 38 which is closely spaced (about one inch) below the outlet 34 of the reservoir. The support member is formed of sheet metal and is about 8 inches wide and extends laterally from side to side (about 19 inches) and is welded within the housing. The support member primarily supports an actuator 40.

Figure 3A:
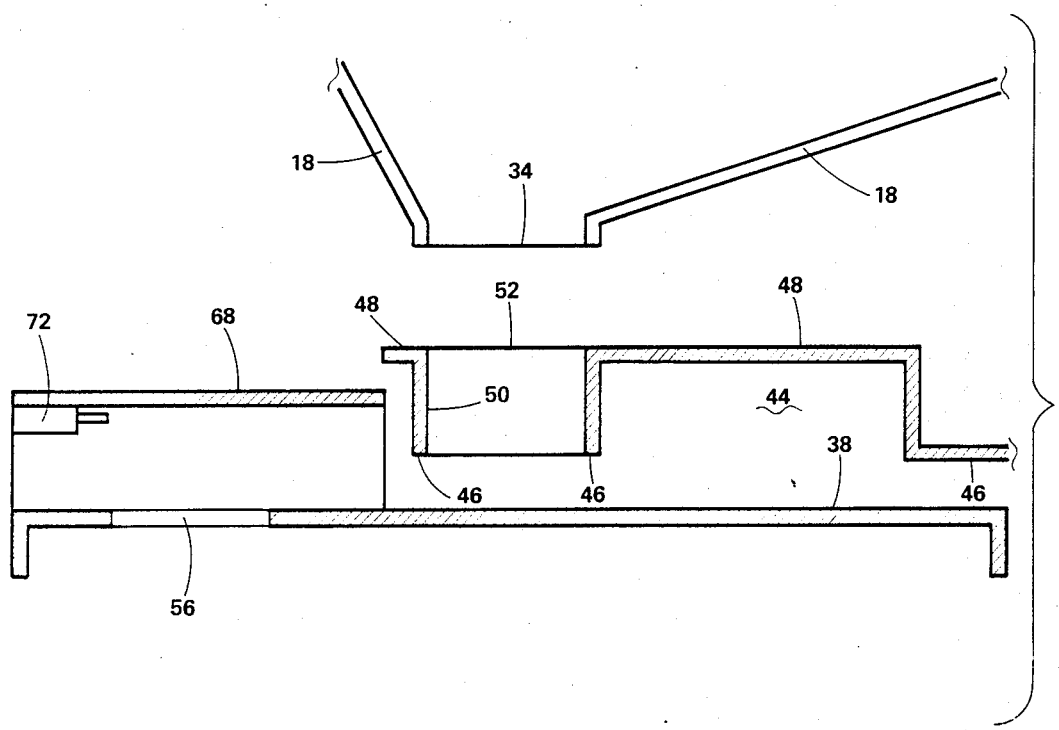
FIG. 3A is an enlarged exploded view of the upper reservoir, the actuator and support member of FIG. 3.

The actuator 40 includes a proximal portion 42 which includes a standard coin responsive pusher with slots, for example to receive four quarters, which when inserted then permits the actuator to be pushed forwardly. The actuator could also be responsive to currency of one or more dollar bills. The actuator extends within the housing and includes a distal portion 44 which is formed from sheet metal and is about 10 inches in length and about 2 inches in width. The distal portion (see particularly FIG. 3A) has a planer lower surface 46 adapted to slidably engage the support member 38, and has a planer upper surface 48 (about 1 inch from the lower surface) adapted to slidably engage the small planer outlet 34 of the reservoir. The distal portion further includes a through-compartment 50 formed therein between the upper and lower surfaces having an opening of about 2 inches by 2 inches (which corresponds to the shape of the outlet 34) and is about 1 inch deep which defines a desired volume of about 4 cubic inches and corresponds to about 2 ounces of peanuts. The through-compartment 50 has an upper compartment opening 52 corresponding in shape (about 2 inches by 2 inches, or a little smaller) to the reservoir outlet 34; and a similarly shaped lower compartment opening 54. The support member 38 includes an aperture 56 formed therein of about 2 inches by 2 inches which is offset about 2 inches (at least the lateral length of the through compartment upper opening) in lateral relationship with the reservoir outlet 34. It is readily seen in FIG. 3 that in the normal position, with the actuator 40 extended rearwardly (to the right in FIG. 3), the upper compartment opening 52 is aligned with the reservoir outlet 34 and the lower compartment opening 54 is closed by the support member 38, and the compartment 50 is thereby filled with peanuts (about 2 ounces). Open insertion of the required amount of coins 58, the machine is ready to be activated.

Figure 4:
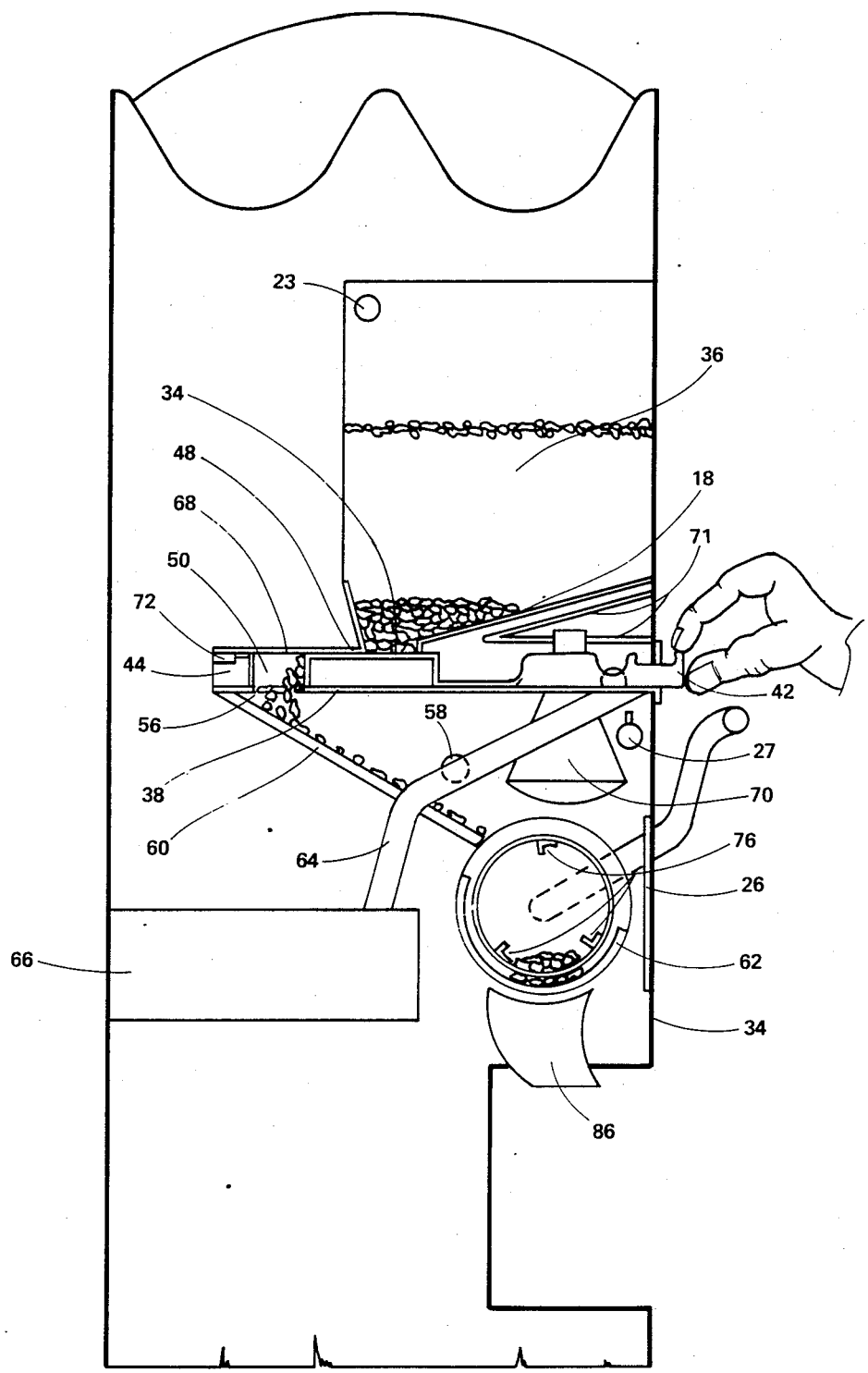
FIG. 4 is a view similar to FIG. 3 wherein the coin responsive actuator is pushed inwardly to operate the machine.

Referring now also to FIG. 4, the machine is activated by pushing on the proximal portion 42 of the actuator which translates the distal portion 44 of the actuator inwardly (to the left in the figure). As the actuator is translated laterally (to the left in the figure) the upper planer surface 48 moves between the layers of peanuts and closes the reservoir outlet 34, while the through-compartment 50, which contains and thereby segregates about 2 ounces of peanuts, is translated so that the lower compartment opening 54 moves over the aperture 56 in support member 38. The segregated peanuts are thereby released from the compartment 50 and drop through the aperture 56 onto a first chute 60 which is inclined downwardly toward a lower reservoir 62; simultaneously, the coins 58 are released from the proximal portion of the actuator and drop onto a second chute 64 which is inclined downwardly toward a coin container 66. The upper surface of support member 38 further includes an inverted U shape housing 68 about 1.125 inches by 2.125 inches by 1.125 inches adapted to receive the distal portion 44 of the actuator to further align and support the slidable actuator.

The lower reservoir 62 is a generally semi-cylindrically shaped container which is oriented horizontally and parallel with the front panel 34 of the housing. The lower reservoir 62 is pivotally mounted within the housing and positioned to be closely spaced (about one inch) from the front panel. The lower reservoir is biased by a torsional spring against a stop (not shown) so that the open portion is normally oriented upwardly so that the enclosed portion is below the chute 60 to readily receive all of the segregated peanuts that roll and slide down the chute 60. The segregated peanuts are heated in the lower reservoir. The lower reservoir is therefore formed of very thin stainless steel to minimize heat losses and has a reflective inner surface to maximize heating efficiency of the reservoir.

The heating of the peanuts in the lower reservoir 62 could be accomplished by a variety of heating means. For example, the reservoir could have a conductive heat source (about 1000 watts) attached thereto which is energized to conductively heat the reservoir and the contents. Another example is a screen type reservoir with an adjacent convective heat source (similar to a 1000 watt hair dryer apparatus) which circulates heated air into an through the reservoir to convectively heat the contents. Another example is the use of a reservoir as detailed in U.S. Pat. No. 4,156,806 to Teich et al and a micro-wave energy source (of about 750 watts) to heat the contents of the reservoir by micro-wave radiation.

Figure 6:
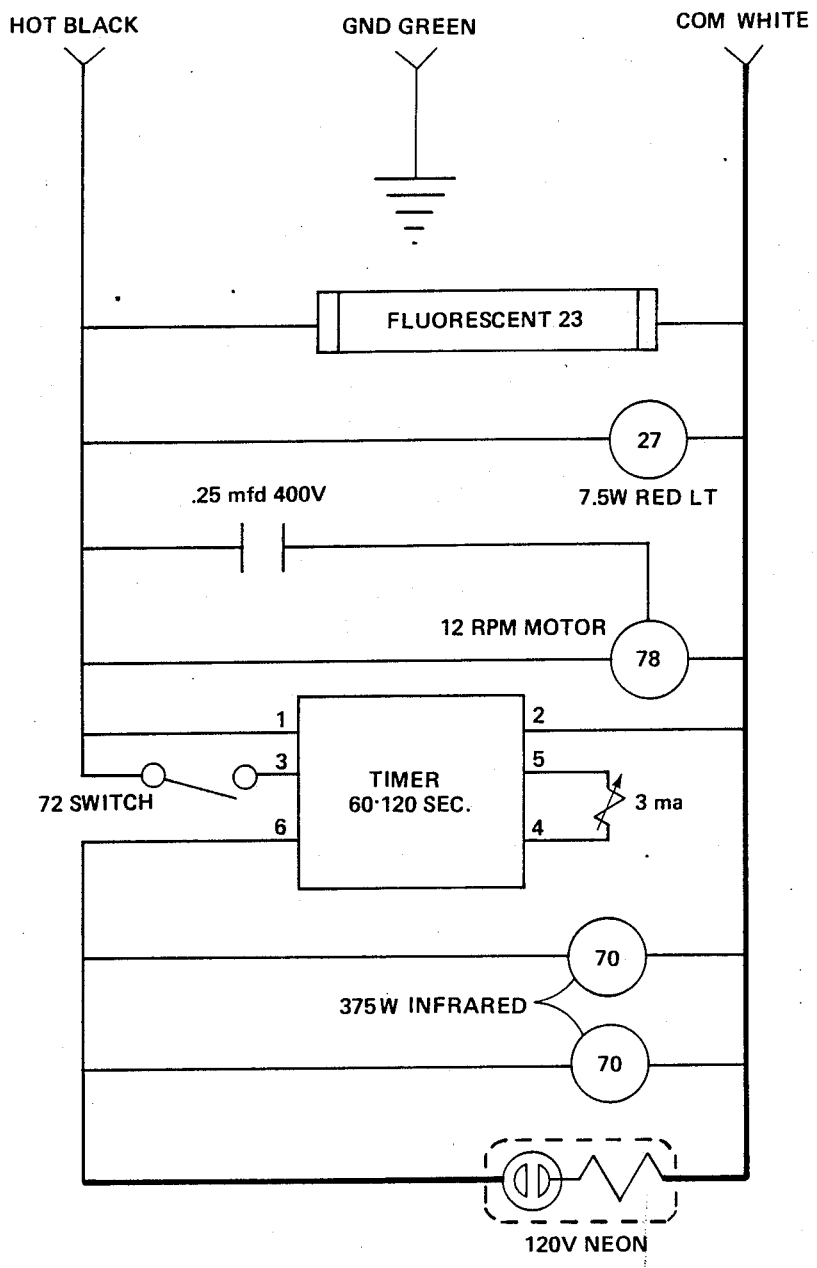
FIG. 6 is a schematic drawing of an electrical circuit for the machine.

The preferred heating means is illustrated in FIG. 2, 4 and 6 and utilizes a pair of infra-red heat lamps 70 positioned adjacently, above the lower reservoir 62. The lamps are secured and positioned by a suitable sheet metal bracket 71 welded within the housing. The lamps can suitably range from 300-400 watts each, and are preferable 375 watts, to rapidly and efficiently heat the peanuts. The lamps are energized by a micro-switch 72, which is closed by the distal end 44 of the actuator (see FIG. 4), which electrically triggers a conventional timer 74 which provides current to the lamps for a predetermined duration ranging from about 60-120 seconds (for fine tuning to produce the desired temperature), and is usually set for 90 seconds. It was found that the infra-red radiation heating of the peanuts could be accelerated by stirring the peanuts to expose additional surfaces of the peanuts to the radiation of the lamps. A suitable stirring means is provided by three stirring blades 76 which are retained by a pair of circular end caps into a generally cylindrically shaped device which is mounted coaxially within the lower reservoir. The stirring blades are rotated within the reservoir at about 12 revolutions per minute by a conventional motor 78. The stirring blades 76 are formed of thin stainless steel reflective material having a slight "L" shaped (in section) and is perforated with numerous small holes so as to permit maximum infra-red light radiation into the reservoir. (Although the stirring blades are only functional during the heating of the peanuts, it was found that the rotating reflective surfaces under the infra red lights was quite interesting as viewed through the front window 26. Therefore the previously mentioned small red incandescent bulb 27 was instated above the blades and the motor was wired to rotate the blades on a continuous basis for the visual effect to attract consumers to use the machine). After about 90 seconds of infra red heating in the reservoir, the peanuts are adequately heated and the timer de-energizes the lamps 70, and the heated peanuts are ready to be dispensed. A suitable neon lamp or light emitting diode (not shown) is provided on the front panel to inform the customer that the peanuts are heated and ready to be dispensed.

Figure 5:
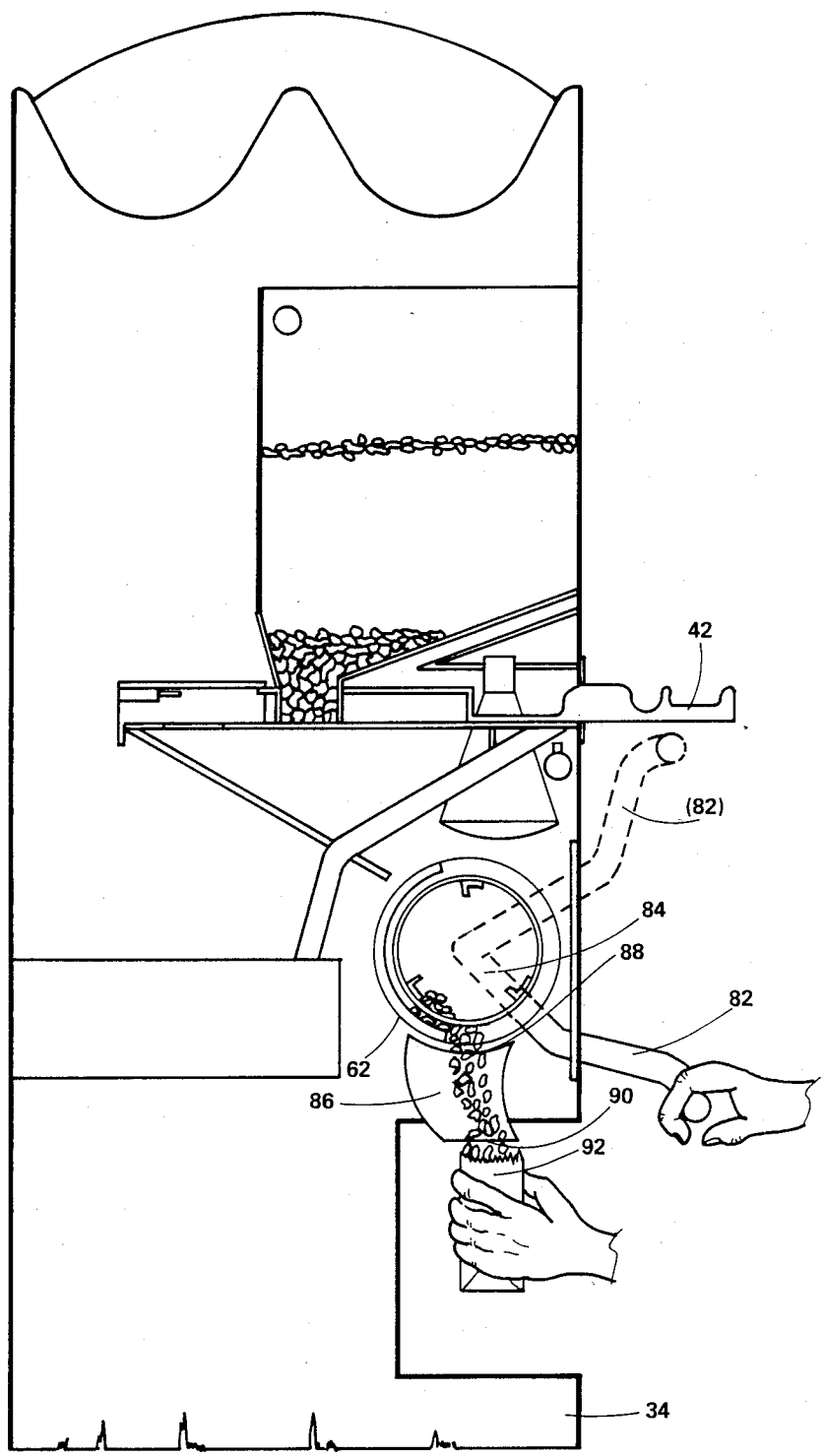
FIG. 5 is a view similar to the FIG. 4 wherein the actuator is returned to the start position and the dispensing lever is pulled downwardly to dispense heated peanuts from the machine.

Referring now also to FIG. 5 there is illustrated the preferred means for dispensing the heated peanuts from the lower reservoir 62. Various motors could be incorporated to automatically rotate the lower reservoir so that the open portion is positioned downwardly to thereby dump the heated peanuts by gravity from the reservoir. However, it was found that consumer participation in the operation of the machine produced more frequent use of the machine. Therefore, preferably, a dispensing handle is provided having a proximal portion 82 extending outside of the housing front panel 32, and a distal portion 84 extending within the housing and attached to the lower reservoir.

The dispensing apparatus further includes a funnel type collection chute 86 having an upper end 88 which extends along the length and width of the lower reservoir, and has a downwardly and forwardly converging lower portion 90 which extends into the forward top portion of the dispensing recess outlet 28 to facilitate dispensing the heated peanuts.

For dispensing the heated peanuts, the operator is instructed to obtain a bag 92 from the bag retainer 30 and place it opened and directly under the chute 90 (preferable with his left hand) and then to pull downwardly on the dispensing handle 82 to rotate the lower reservoir and thereby to dispense the heated peanuts into the bag 92 for consumption.

The operation of the vending machine 10 is summarized as follows:

The operator first places the required quantity of coins within the proximal portion of an actuator, then pushes the actuator inwardly. The distal portion of the actuator then segregated a desired portion (about 2 ounces) of peanuts from an upper reservoir and closes a micro switch to trigger a timer which energizes a pair of heat lamps positioned over a lower reservoir. The segregated portion of peanuts is immediately delivered by a gravity chute into the lower reservoir where the portion is heated for about 90 seconds. The actuator returns to its outwardly position in preparation for the next customer. The operator is informed when the peanuts have been heated. The operator then takes a bag from a bag retainer and places it open under a recessed outlet in the front of the machine and pulls a dispensing handle downwardly thereby dispensing the heated peanuts into the bag. The process can be repeated every 90 seconds until it is necessary to add peanuts to the upper reservoir.

While specific embodiments of the present invention have been illustrated and described herein, it is realized that modifications and changes will occur to those skilled in the art. It is therefore to be understood that the appended claims are intended to cover all such modifications and changes as fall within the true spirit and scope of the invention.

I claim:

1. A vending machine for dispensing heated peanuts comprising:
   a substantially enclosed housing, having an upper, a lower and a front portion thereof;
   an upper reservoir within the upper portion of said housing for containing a quantity of peanuts, and including a bottom thereof having a small planar outlet for permitting peanuts to fall from said upper reservoir when the outlet is not covered;
   an actuator means having a proximal portion extending outside of the front of said housing and a distal segregator portion supported near the outlet of said upper reservoir and moveable within said housing for segregating a desired relatively small quantity of peanuts from said upper reservoir;
   a lower reservoir enclosed within said housing and displaced from said upper reservoir for receiving the small quantity of peanuts from said segregator portion of said actuator;
   means for heating only the small quantity of peanuts within said lower reservoir; and
   means for dispensing the heated peanuts from said lower reservoir to an exterior outlet in the front of said housing.

2. A vending machine as in claim 1 wherein the upper portion of said housing includes a transparent wall for displaying a quantity of peanuts within said upper reservoir.

3. A vending machine as in claim 1 wherein the lower portion of said housing includes a transparent window for displaying said lower reservoir.

4. A vending machine as in claim 1 wherein said dispensing means comprises a recess in said housing having said outlet chute adapted for receiving heated peanuts from said lower reservoir and for directing peanuts into a container.

5. A vending machine as in claim 1 wherein said heating means comprises radiant heat lamps directed into said lower reservoir, and circuitry means for energizing said heating means.

6. A vending machine as in claim 1 wherein the bottom of said upper reservoir has inclined surfaces sloping downwardly toward the planer outlet.

7. A vending machine as in claim 1 wherein said actuator means is coin or currency responsive having the proximal portion thereof adapted to be fixed into a first position for receiving a designated coinage or currency and thereafter movable inwardly into a second position whereby the coinage or currency is deposited within said housing and the distal segregator portion thereof segregates the portion of peanuts from said upper reservoir and said actuator is then returnable to the fixed first position.

8. A vending machine as is claim 7 further comprising a coin chute means for receiving the coinage or currency released by said actuator means and which is inclined downwardly to a container within said housing.

9. A vending machine as in claim 1 which further includes a timer means coupled to said heating means whereby said heating means is applied for a predetermined duration.

10. A vending machine as in claim 9 wherein said heating means comprises two radiant heat lamps ranging from 300 to 400 watts each.

11. A vending machine as in claim 10 wherein said heating means comprises two radiant heat lamps of about 375 watts each and said timer means duration ranges from about 60 to 120 seconds.

12. A vending machine as in claim 1 further comprising a generally planer support member fixed generally horizontally within said housing and closely spaced below the outlet of said upper reservoir, and having an aperture therein which is offset laterally in relationship to the outlet of said upper reservoir.

13. A vending machine as in claim 12 further comprising a first chute means inclined downwardly from the aperture of said fixed support member to said lower reservoir for transferring peanuts to said lower reservoir.

14. A vending machine as in claim 12 wherein said distal portion of said actuator means comprises a laterally slidable member having a planer upper surface adapted to slidably engage the outlet of said upper reservoir, and a planer lower surface adapted to slidably engage said fixed support member, and having a through-compartment formed therein between the upper surface and the lower surface defining a volume corresponding to the desired small quantity of peanuts and having an upper surface compartment opening and a lower surface compartment opening whereby said slidable member is in a first lateral position having the upper surface compartment opening aligned with the outlet of said upper reservoir and having the lower surface compartment opening enclosed by said fixed support member for filling the compartment with peanuts from said upper reservoir, and whereby said slidable member is translatable into a second lateral position having the upper planer surface closing said upper reservoir outlet and having the lower surface compartment opening aligned with the aperture in said fixed support member for emptying the peanuts from said compartment thereby segregating the desired quantity of peanuts from said upper reservoir.

15. A vending machine as in claim 14 further comprising a first chute means inclined downwardly from the aperture of said fixed support member to said lower reservoir for transferring peanuts to said lower reservoir.

16. A vending machine as in claim 1 wherein said lower reservoir comprises a generally semi-cylindrically shaped container oriented generally horizontally and parallel with and closely spaced from the front of said housing, wherein said lower reservoir is biased into a receiving position having the open portion thereof oriented upwardly for receiving the segregated peanuts from the actuator means, and is pivotable into an emptying position having the open portion thereof oriented downwardly for dispensing the heated peanuts from said lower reservoir.

17. A vending machine as in claim 16 wherein said lower reservoir further includes a handle attached thereto and which extends outside the front of said housing to facilitate the pivoting of said lower reservoir for dispensing the peanuts from said housing.

18. A vending machine as in claim 16 further comprising a means for stirring peanuts within said lower reservoir to facilitate heating of the peanuts.

19. A vending machine as in claim 18 wherein said stirring means comprises a plurality of rotatable blades arranged generally cylindrically and coaxially within said lower reservoir.

20. A vending machine as in claim 19 wherein said stirring means further comprises a motor means for providing rotation of said stirring means.

21. A method for dispensing heated peanuts from a vending machine comprising:
providing a bulk quantity of peanuts in an upper reservoir;
pushing a coin responsive actuator which has a distal portion which segregates a desired small portion of peanuts from said upper reservoir, and further releases the segregated portion to a lower reservoir which is displaced from said upper reservoir;
heating only the small portion of peanuts within said lower reservoir; and
dispensing the heated peanuts from said lower reservoir into a container.

22. A vending machine for dispensing heated peanuts, comprising:
a substantially enclosed housing having an upper, a lower and a front portion thereof;
an upper reservoir within the upper portion of said housing for containing a quantity of peanuts, and including a bottom thereof having a small planer outlet for permitting peanuts to fall from said upper reservoir when the outlet is not covered;
said upper portion of said housing having a transparent wall for displaying a quantity of peanuts within said upper reservoir;
said housing further including a generally planer support member fixed generally horizontally within said housing and closely spaced below the outlet of said upper reservoir and having an aperture therein which is offset laterally in relationship to the outlet of said upper reservoir;
an actuator including a proximal portion thereof extending outside of the front of said housing and adapted to receive coinage, and a distal portion thereof extending within said housing and including a laterally slidable member having a planer upper surface adapted to slidably engage the outlet of said upper reservoir and a planer lower surface adapted to slidably engage said fixed support member and having a through compartment formed therein between the upper surface and the lower surface defining a volume corresponding to a desired small quantity of peanuts and having an upper surface compartment opening and a lower surface compartment opening whereby said slidable member is in a first lateral position having the upper surface compartment opening aligned with said outlet and having the lower surface compartment opening enclosed by said fixed support member for filling the compartment with peanuts, and whereby said slidable member is translatable into a second lateral position having the upper planer surface closing said outlet and having the lower surface compartment opening aligned with the aperture in said fixed member for emptying the peanuts from the compartment;
a lower reservoir for receiving the small quantity of peanuts;
a first chute means inclined downwardly from the aperture in said fixed support member to said lower reservoir for facilitating the transfer of peanuts to said lower reservoir;
said lower reservoir including a generally semi-cylindrically shaped container positioned generally horizontally and parallel within and closely spaced from the front of said housing, and biased into a receiving position having the open portion thereof oriented upwardly for receiving peanuts and is pivotable into an emptying position having the open portion thereof oriented downwardly for dispensing peanuts from said lower reservoir;

a stirring means including a plurality of rotatable blades arranged generally cylindrically and coaxially within said lower reservoir;

a set of radiant heat lamps directed toward said lower reservoir for heating the peanuts in said lower reservoir;

circuitry means including a switch means actuatable by the distal portion of said actuator, a timer means triggered by said switch means for energizing said heat lamps for a designated duration, and motor means for rotating said stirring means; and means for pivoting said lower reservoir for dispensing the heated peanuts from said housing.

* * * * *